(12) United States Patent
Shih

(10) Patent No.: US 6,514,590 B1
(45) Date of Patent: *Feb. 4, 2003

(54) SEAM STRUCTURE OF RUBBER SHEETS

(75) Inventor: Arthur Tseshao Shih, El Monte, CA (US)

(73) Assignee: Peca Corporation, El Monte ( * ) Notice: Subject to any disclaimer, the term of this patent is extended or adjusted under 35 U.S.C. 154(b) by 27 days.

This patent is subject to a terminal disclaimer.

(21) Appl. No.: 09/670,200

(22) Filed: Sep. 25, 2000

(51) Int. Cl.$^7$ ................................................ B32B 3/10
(52) U.S. Cl. ........................................ 428/60; 428/61
(58) Field of Search .................... 428/60, 61; 2/275

(56) References Cited

U.S. PATENT DOCUMENTS 4,366,014 A * 12/1982 Pollard .................. 428/60
6,124,010 A * 9/2000 Shih ...................... 428/60

* cited by examiner

Primary Examiner—Alexander S. Thomas
(74) Attorney, Agent, or Firm—Raymond Y. Chan; David and Raymond Patent Group

(57) ABSTRACT

A seam structure for connecting two rubber sheets in edge-to-edge manner, wherein the connection surfaces (i.e. the adhering area) between the edge joints of the two rubber sheets are respectively enlarged without increasing the thickness of the rubber sheets. The seam structure includes a base edge joint having a L-shaped cross section provided at an end edge of the first rubber sheet and a covering edge joint having a L-shaped cross section provided at an end edge of the second rubber sheet. The base edge joint has a root portion and an end portion defining a base connection surface extended sidewardly from the root portion to the end portion. The covering edge joint has a root portion and an end portion defining a covering connecting surface extended sidewardly from the root portion to the end portion thereof Therefore, the covering connection surface is adapted to be sealingly attached on the base connection surface so as to overlappingly connect the covering edge joint with the base edge joint.

15 Claims, 7 Drawing Sheets

SEAM STRUCTURE OF RUBBER SHEETS

BACKGROUND OF THE PRESENT INVENTION

1. Field of Invention

The present invention relates to outdoor outer wears, especially for wader and diving products, and more particularly to a seam structure for constructing water sport wear products such as waders and outdoor wears, which can more strongly and firmly connect two thinner rubber sheets edge by edge together in waterproof manner.

2. Description of Related Arts

Various kinds of waterproof and/or heat insulation sportswear are provided in the market for outdoor sports such as hunting, fishing, diving, and etc. In order to ensure waterproof and heat insulation features, sportswear products such as waders, diving suits and wetsuits may be constructed with rubber sheet materials.

Normally, two side surfaces of the rubber sheet are respectively coated with fabric, for example the nylon jersey knit, or cotton. Like the production of clothing, a large rubber sheet is cut to pieces, which are connected edge to edge to form the wader, diving suit or wetsuit, as shown in FIG. 1. As shown in FIG. 2, a conventional seam structure 10 for connecting two rubber sheets 11, 12 together edge-to-edge is illustrated, wherein the conventional seam structure 10 is constructed by the following steps:

1. Attach the two edges portions 111, 121 of the two rubber sheets 11, 12 overlappedly together to form a connection portion of the two rubber sheets 11, 12.
2. Heat the edge portions 111, 121 of the two rubber sheets 11, 12 together sing a vulcanized process until the two edge portions 111, 121 are integated together.
3. Rubber tapes 14 can be glued to cover the connection portion of the rubber sheets 11, 12 on either one side or both sides if waterproof feature is required.

In view of the above disclosed conventional seam structure, it can provide a strong seam structure that firmly connects two rubber sheets 11, 12 together because the connection surfaces which are the edge portions of the two rubber sheets 11, 12 are respectively enlarged.

However, the major drawback of the conventional seam structure is that the connection portion of the two rubber sheets 11, 12 will increase of its thickness because the edge portions 111, 121 of the two rubber sheets 11, 12 are overlapped together, which doubles the thickness thereof. It is unreasonable to increase the thickness of the connection portion of the two rubber sheets 11, 12, which may destroy the aesthetic appearance of the sportswear.

SUMMARY OF THE PRESENT INVENTION

A main object of the present invention is to provide a seam structure for connecting two rubber sheets in edge-to edge manner, wherein the connection surfaces (i.e. the adhering area) between the edge joints of two rubber sheets are respectively enlarged without increasing the thickness of the rubber sheets.

Another object of the present invention is to provide a seam structure for connecting two rubber sheets in edge-to edge manner, wherein simply by surlfurizing the enlarged connection surfaces of the edge joints of the rubber sheets, the enlarged connection areas can provide a strong seam structure that firmly connects the two rubber sheets together, even without the need for stitching or rubber tapes, while still providing waterproof and insulation features for sportswear constructed from the rubber sheets.

Another object of the present invention is to provide a seam structure for two rubber sheets having enlarged edge joints for integrating the two rubber sheets together through a vulcanized process, that allows two rubber sheets to be connected with sufficient strength to overcome horizontal separating forces.

Accordingly, in order to accomplish the above objects, the present invention provides a seam structure for connecting a first rubber sheet and a second rubber sheet to form an integrated rubber sheet with even thickness, wherein the seam structure comprises:

a base edge joint provided at an end edge of the first rubber sheet, the base edge joint having a root portion and an end portion defining a base connection surface extended sidewardly from the root portion to the end portion; and a covering edge joint provided at an end edge of the second rubber sheet, the covering edge joint having a root portion and an end portion defining a covering connecting surface extended sidewardly from the root portion to the end portion thereof, wherein the covering connecting surface is adapted to be sealingly adhered on the base connection surface so as to overlappingly connect the covering edge joint with the base edge joint.

DETAILED DESCRIPTION OF THE PREFERRED EMBODIMENT

Figure 3:
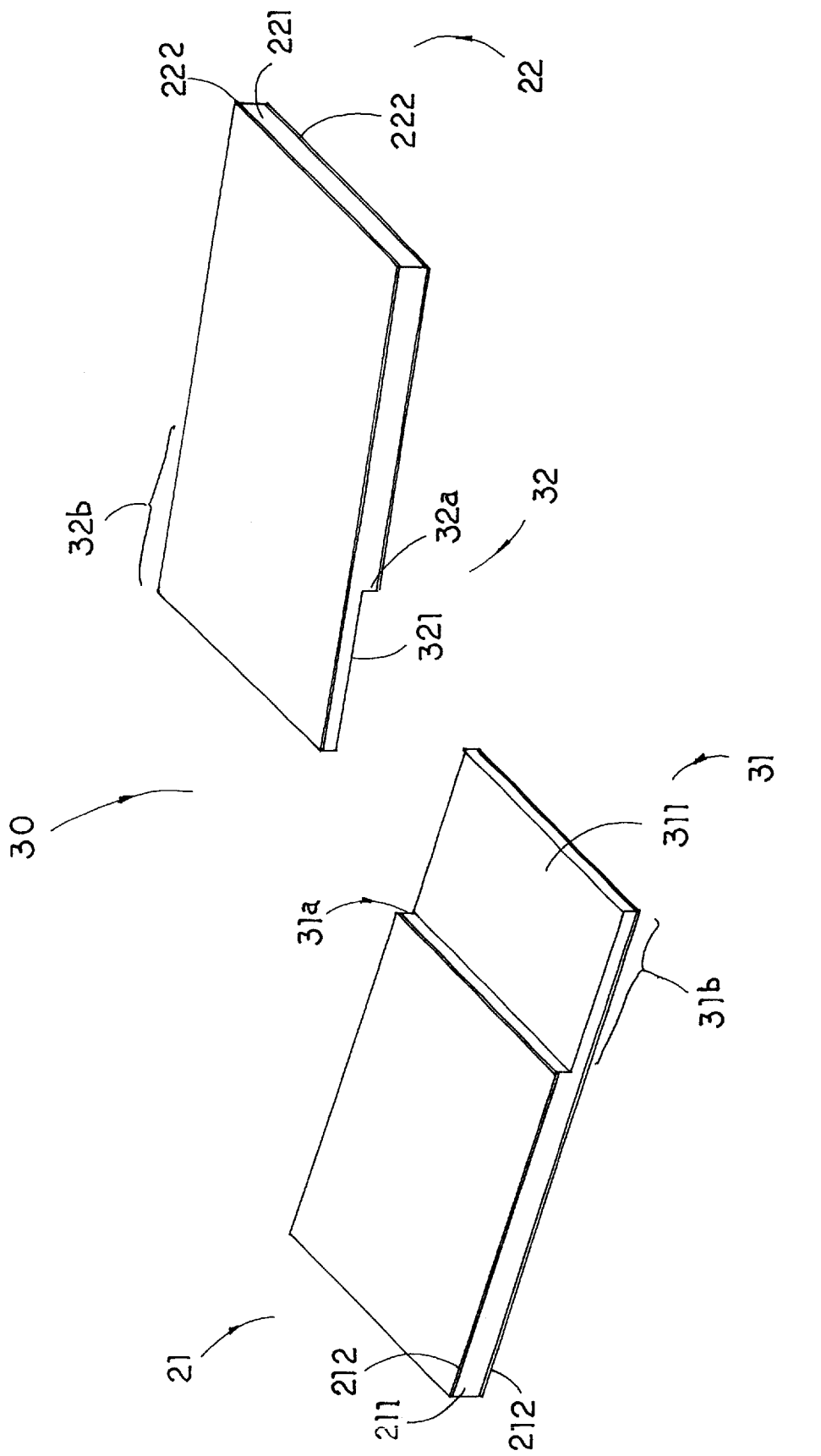
FIG. 3 is an exploded perspective view of two edge joints of two rubber sheets before connecting to form the seam structure according to a preferred embodiment of the present invention.

Referring to FIG. 3 of the drawings, a seam structure 30 of connecting two edge joints of two rubber sheets, according to a preferred embodiment of the present invention, is illustrated. Each of the two rubber sheets 21, 22 comprises a sheet body 211, 221 having a predetermined thickness made of rubber, and two fabric layers 212, 222, made of nylon jersey knit or cotton, are respectively coated on two sides of the sheet body 211, 221.

In order to connect two rubber sheets 21, 22 to form an integrated rubber sheet having larger surface area and same even thickness, or connect pieces of rubber sheet made component to construct a sportswear, the first rubber sheet 21 provides at least a base edge joint 31 having a L-shaped cross section and the second rubber sheet 22 forms at least a covering edge joint 32 having a L-shaped cross section adapted to connect with the base edge joint 31 to construct the seam structure of the present invention.

Figure 1:
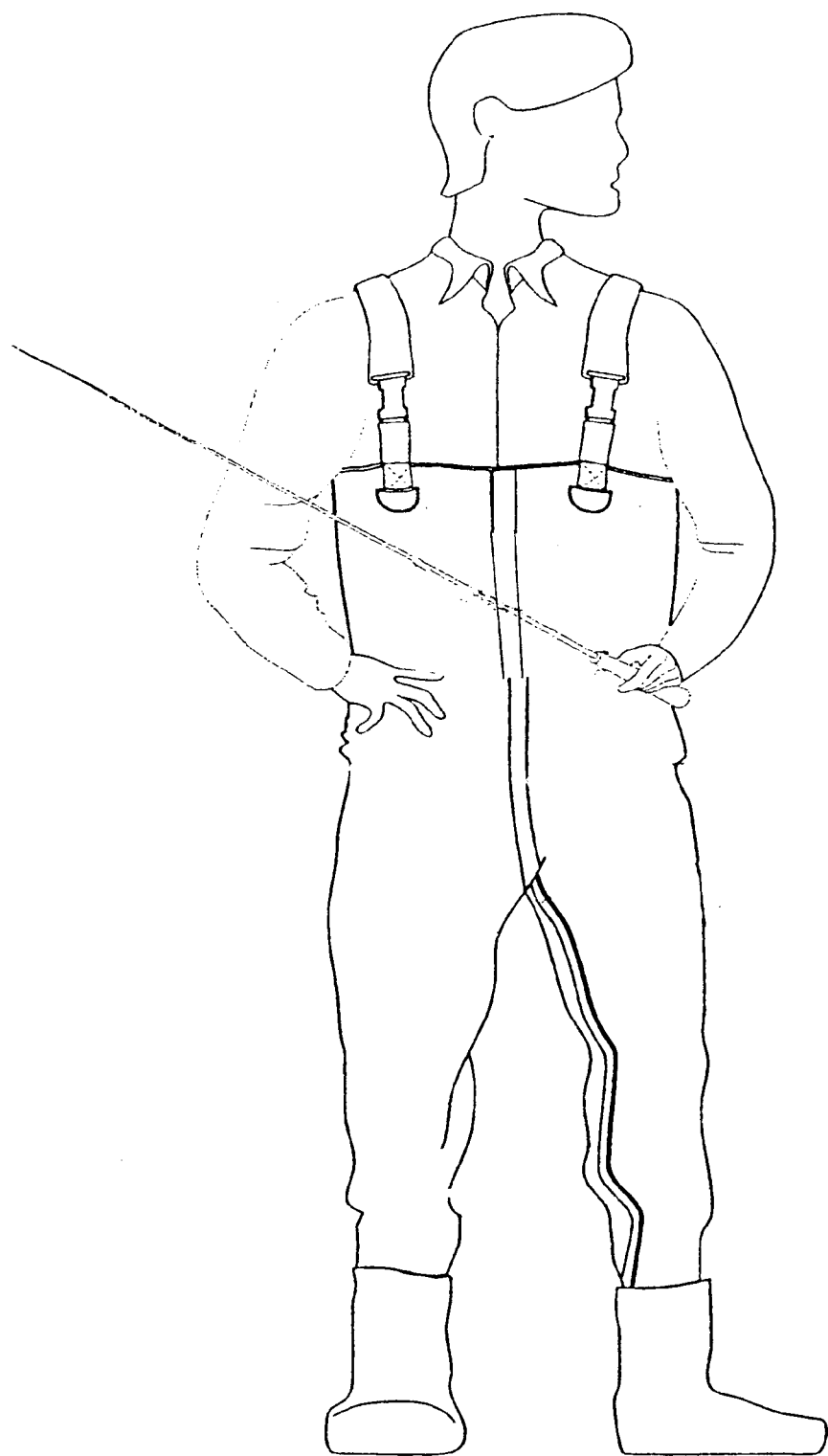
FIG. 1 is a schematic view illustrating the conventional seam structure on fishing warders.
Figure 2:
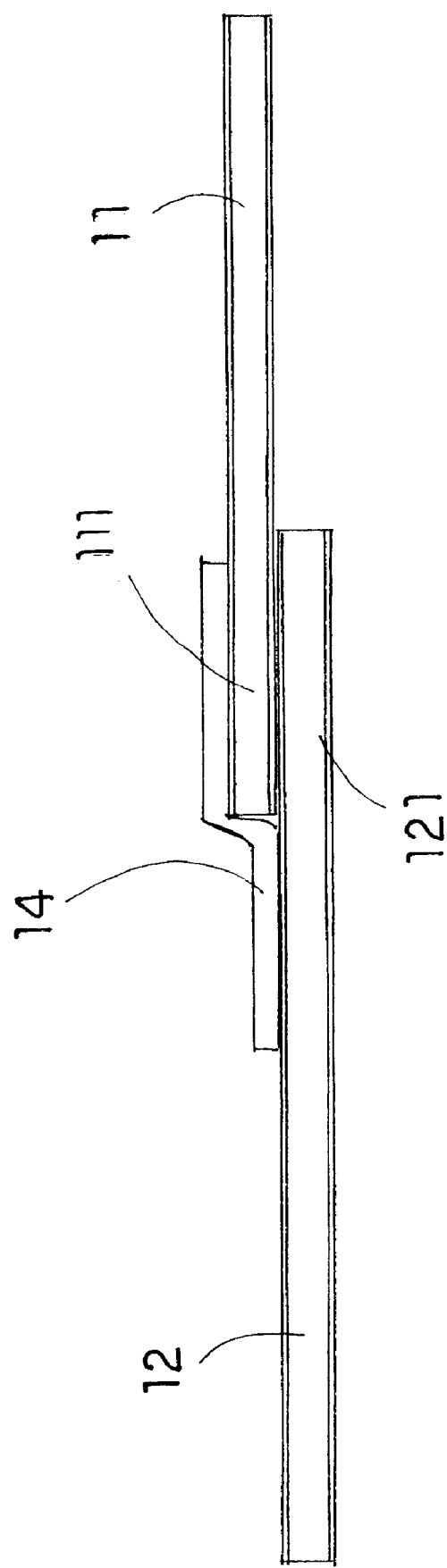
FIG. 2 is a sectional view of the conventional seam structure with rubber tape covered.

The seam structure 30 forms a tight seal joint that integrally connects the covering edge joint 32 with the base edge joint 31 of the two rubber sheets 21, 22. Since normally the two rubber sheets 21, 22 have the same predetermined thickness, the seam structure 30 is preferred to have a thickness equal to the thickness of the rubber sheet 21, 22, that is why the conventional seam structure as shown in FIG. 2 does not simply overlap the two edges portions of the two rubber sheets which doubles the thickness.

Figure 4:
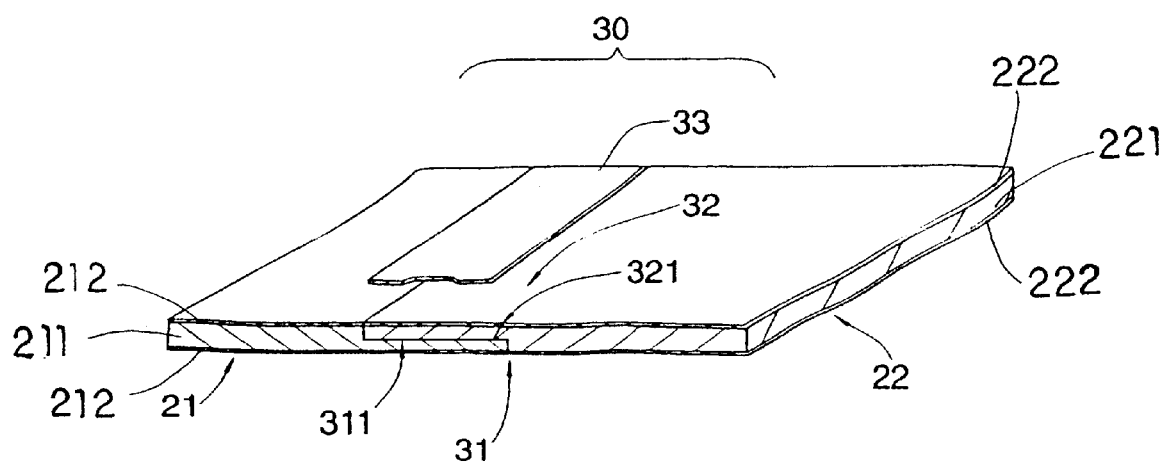
FIG. 4 is a sectional perspective view of the seam structure according to the above preferred embodiment of the present invention.

According to the preferred embodiment of the present invention, as shown in FIGS. 3 and 4, the base edge joint 31 of the first rubber sheet 21 has a root portion 31a and an end portion 31b defining a base connection surface 311 extended sidewardly from the root portion 31a to the end portion 31b. The thickness of the root portion 31a equals to the thickness of the first rubber sheet 21 and the end portion 31b is reduced to a predetermined thickness, preferably half of the thickness of the first rubber sheet 21. In other words, the sheet body 211 is cut horizontally to form the horizontal base connection surface 311 facing upward in such a manner that the end portion 31b of the first rubber sheet 21 has a constant thickness.

The covering edge joint 32 of the second rubber sheet 22 also has a root portion 32a and an end portion 32b defining a covering connection surface 321 extended sidewardly from the root portion 21a to the end portion 32b. The thickness of the roots portion 32a equals to the thickness of the second rubber sheet 22 and the end portion 32b is reduced to a predetermined thickness, preferably half of the thickness of the second rubber sheet 22. In other words, the sheet body 221 is cut horizontally to form the horizontal covering connection surface 321 facing downward in such a manner that the end portion 32b of the second rubber sheet 22 has a constant thickness.

As shown in FIG. 4, the thickness of the end portion 31b of the first rubber sheet 21 and the end portion 32b of the second rubber sheet 22 should be equal with each other correspondingly, so as to adapted for overlapping with each other. Alternatively, the thickness of the rubber sheet 21, 22 is equal to the total thickness of the end portion 31b of the first rubber sheet 21 and the end portion 32b of the second rubber sheet 22, so as to maintain an overall thickness of the seam structure equal to the thickness of the rubber sheets 21, 22.

Accordingly, to connect the first and second rubber sheets 21, 22 edge-to-edge, adhesive substance is evenly applied to both the base connecting surface 311 and the covering connection surface 321. Then, press the covering connection surface 321 against the base connection surface 311 until the base and covering connection surfaces 311, 321 are firmly adhered with each other, so that the covering edge joint 32 is overlappingly connected on top of the base edge joint 31 to form the seam structure 30 of the present invention.

The seam structure 30 further comprises a rubber made additional covering flap 33 for sealedly gluing along a top seam and/or a bottom seam of the base and covering edge joints 31, 32 of the two rubber sheets 21, 22 for sealedly covering the connection between the root portion 31a of the base edge joint 31 and the end portion 32b of the overing edge joint 32 for ensuring insulation and waterproofing.

Figure 5:
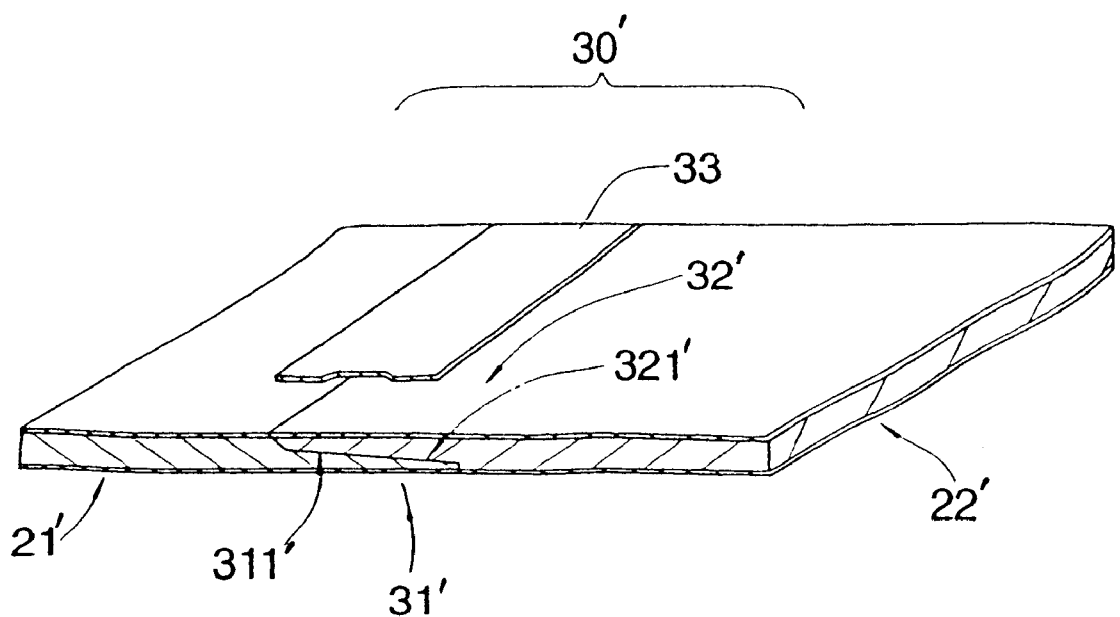
FIG. 5 is a sectional perspective view of the seam structure according to a first alternative mode of the above preferred embodiment of the present invention.

Referring to FIG. 5, a first alternative mode of the seam structure 30' is illustrated. In order to strengthen the seam structure 30 of the present invention, the first rubber sheet 21 provides a slant base connection surface 311' wherein the sheet body 211 is cut inclinedly to gradually reduce the thickness of the base edge joint 31 from the root portion 31a to the end portion 31b so as to form the slant base connection surface facing upwards.

Thus, the second rubber sheet 22' provides a slant covering connection surface 321' wherein the sheet body 221' is cut inclindedly to gradually reduce the thickness of the covering edge joint 32' from the root portion 32a' to the end portion 32b' so as to form the slant covering connection surface 321' facing downward.

It is worth to mention that the inclined angles of the slant base connection surface 311' and the slant covering base connection surface 321' should be equal with each other correspondingly, so as to adapted for overlapping with each other without increasing the overall thickness of the seam structure 30'.

Since the connection surfaces between the two rubber sheets 21', 22' are substantially the slant base connection surface 311' and the slant covering connection surface 321', each of which provides much larger adhering area so that the connection of the seam structure 30' is largely enhanced without increasing the thickness of the rubber sheets 21', 22'. In other words, the inclined connection of the seam structure 30' can provide a stronger connection that allows a greater separation forces which are applied to the two rubber sheets 21', 22' in opposite direction in order to attempt pulling the two rubber sheets 21', 22' apart to separate the seam structure 30'.

Figure 6:
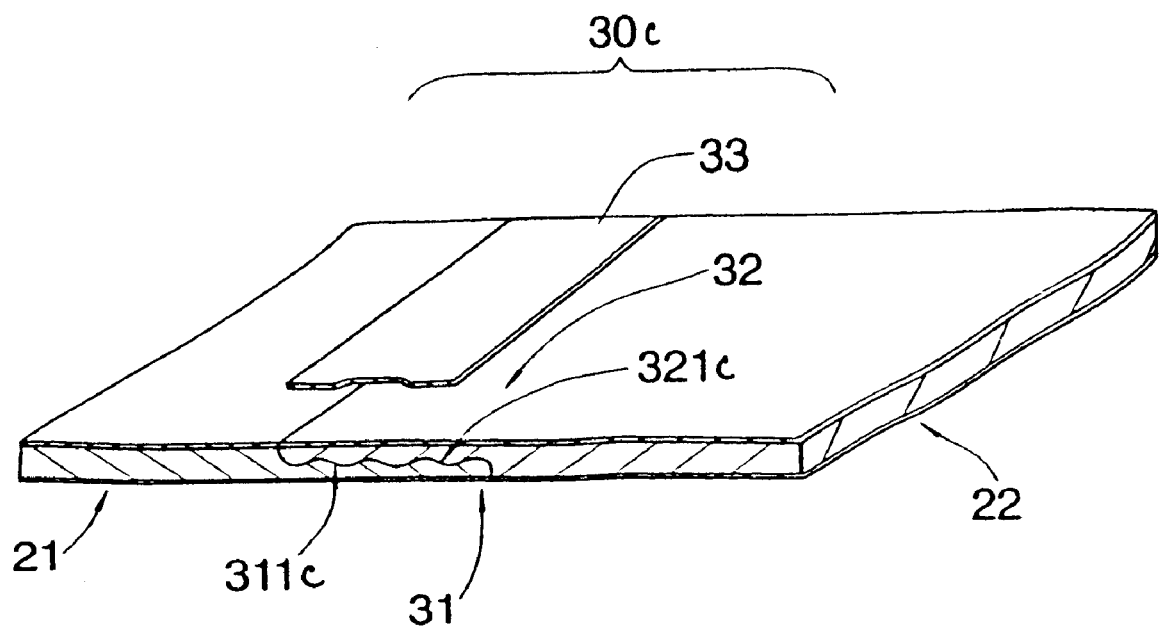
FIG. 6 is a sectional perspective view of the seam structure according to a second alternative mode of the above preferred embodiment of the present invention.
Figure 7:
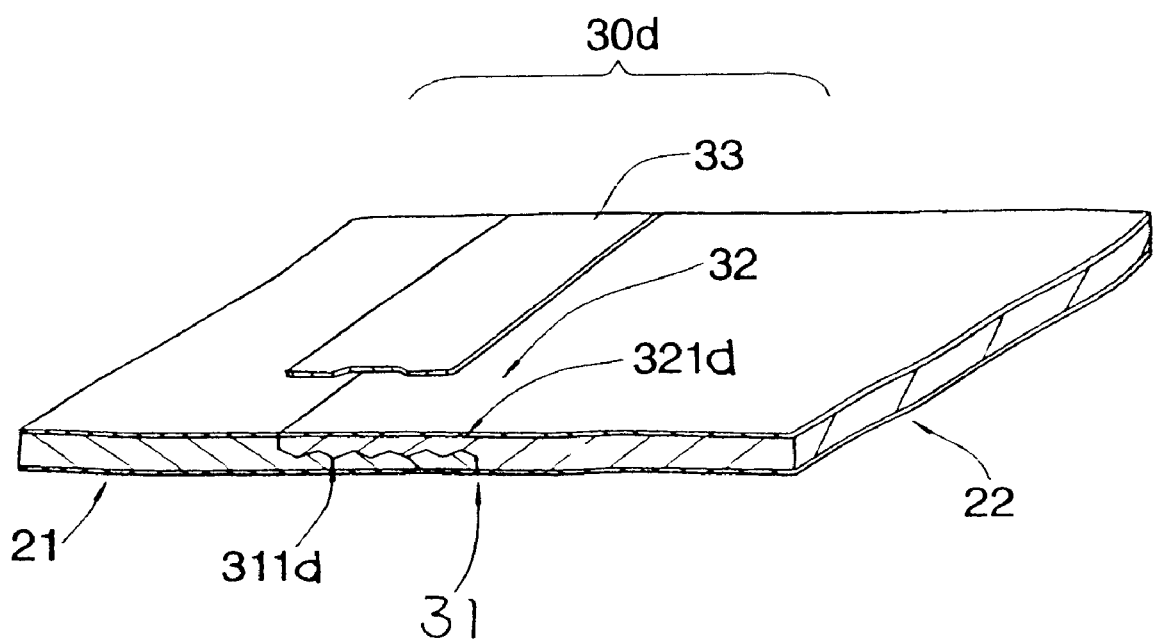
FIG. 7 is a sectional perspective view of the seam structure according to a third alternative mode of the above preferred embodiment of the present invention.

As shown in FIGS. 6 and 7, a second and third alternative modes of the seam structure 30c (30d) according to the preferred embodiment of the present invention are illustrated, wherein the base connecting surface 311c (311d) and the covering connecting surface 321c (321d) are respectively provided a rough surface thereon, so as to increase the mutual friction between the base connecting surface 311c (311d) and the covering connecting surface 321c (311d) for further strengthen the seam structure 30c (30d).

As shown in FIG. 6, the rough base connecting surface 311c and the rough covering connecting surface 321c are respectively formed as a wave-form, and as shown in FIG. 7, the rough base connecting surface 311d and the rough covering connecting surface 321d respectively have a plurality of V-shaped teeth provided thereon. So, when the rough base connecting surface 311c (311d) and the rough covering connecting surface 321c (321d) are fittedly overlapped each other, the rough surfaces thereof will increase the connection surface area and provide mutual friction therebetween.

In view of the above preferred embodiment and its alternative modes, the present invention provides a strong seam structure that firmly connects two rubber sheets together and maintain the overall thickness of the seam structure which is the same thickness of the rubber sheets. Thus, the overlapping connection between the base and covering connection surfaces can be operated in an easier and more precise manner because of the connection surface area. One can simply overlap the covering edge joint on the base edge joint so as to connect the two edge joints together, wherein no specific alignment skill is requires but higher precision can be achieved.

What is claimed is:

1. A seam structure for connecting a first rubber sheet and a second rubber sheet to form an integrated rubber sheet having even thickness, wherein each of said two rubber sheets comprises a sheet body having a predetermined thickness, said seam structure comprising:

a base edge joint having a L-shaped cross section provided at an end edge of said first rubber sheet, said base edge joint having a root portion and an end portion defining a base connection surface extended sidewardly from said root portion to said end portion; and a covering edge joint having a L-shaped cross section provided at an end edge of said second rubber sheet, said covering edge having a root portion and an end portion defining a covering connection surface extended sidewardly from said root portion to said end portion thereof, wherein said covering connection surface is sealingly attached to said base connection surface so as to overlappingly connect said covering edge joint with said base edge joint, wherein each of said first and second rubber sheets further comprises a top fabric layer and a bottom fabric layer coated on a top side and a bottom side of said sheet body thereof.

2. The seam structure, as recited in claim 1, wherein a thickness of said root portion of said base edge joint equals to a thickness of said first rubber sheet and said end portion of said base edge joint is reduced to a predetermined thickness, said sheet body of said first rubber sheet being cut horizontally to form said horizontal base connection surface facing upward in such a manner that said end portion of said base edge joint has a constant thickness; moreover, a thickness of said roots portion of said covering edge joint equals to a thickness of said second rubber sheet and said end portion of said covering edge joint is reduced to a predetermined thickness, said sheet body of said second rubber sheet being cut horizontally to form said horizontal covering connection surface facing downward in such a manner that said end portion of said covering edge joint has a constant thickness.

3. The seam structure, as recited in claim 2, wherein said thickness of said end portion of said base edge joint, which is half of said thickness of said first rubber sheet, equals to said thickness of said end portion of said covering edge joint which is half of thickness of said second rubber sheet.

4. The seam structure, as recited in claim 3, further comprising an additional covering flap sealedly attached along a top seam of said base and covering edge joints of said two rubber sheets for sealedly covering a connection between said root portion of said base edge joint and said end portion of said covering edge joint.

5. The seam structure, as recited in claim 3, wherein said base connection surface and said covering connection surface are respectively a rough surface which is formed as a wave-form.

6. The seam structure, as recited in claim 3, wherein said base connection surface and said covering connection surface are respectively a rough surface having a plurality of V-shaped teeth provided thereon.

7. The seam structure, as recited in claim 2, further comprising an additional covering flap sealedly attached along a top seam of said base and covering edge joints of said two rubber sheets for sealedly covering a connection between said root portion of said base edge joint and said end portion of said covering edge joint.

8. The seam structure, as recited in claim 2, wherein said base connection surface and said covering connection surface are respectively a rough surface which is formed as a wave-form.

9. The seam structure, as recited in claim 2, wherein said base connection surface and said covering connection surface are respectively a rough surface having a plurality of V-shaped teeth provided thereon.

10. The seam structure, as recited in claim 1, wherein a thickness of said root portion of said base edge joint equals to a thickness of said first rubber sheet and said sheet body of said first rubber sheet is cut inclinedly to gradually reduce a thickness of said base edge joint from said root portion to said end portion so as to form said slant base connection surface facing upwards, and wherein a thickness of said root portion of said covering edge joint equals to a thickness of said second rubber sheet and said sheet body of said second rubber sheet is cut inclinedly to gradually reduce a thickness of said covering edge joint from said root portion to said end portion so as to form said slant covering connection surface facing downward.

11. The seam structure, as recited in claim 10, wherein inclined angles of said slant base connection surface and said slant covering base connection surface are equal with each other correspondingly, so as to adapted for overlapping with each other without increasing an overall thickness of said seam structure.

12. The seam structure, as recited in claim 11, further comprising an additional covering flap sealedly attached along a top seam of said base and covering edge joints of said two rubber sheets for sealedly covering a connection between said root portion of said base edge joint and said end portion of said covering edge joint.

13. The seam structure, as recited in claim 12, wherein said base connection surface and said covering connection surface are respectively a rough surface which is formed as a wave-form.

14. The seam structure, as recited in claim 12, wherein said base connection surface and said covering connection surface are respectively a rough surface having a plurality of V-shaped teeth provided thereon.

15. The seam structure, as recited in claim 10, further comprising an additional covering flap sealedly attached along a top seam of said base and covering edge joints of said two rubber sheets for sealedly covering a connection between said root portion of said base edge joint and said end portion of said covering edge joint.

\* \* \* \* \*